Sept. 14, 1965  M. G. GABRIEL  3,205,662

MULTIPLE ELEMENT HYDROKINETIC TORQUE CONVERTER MECHANISM

Filed Nov. 3, 1964  5 Sheets-Sheet 1

INVENTOR:
MARTIN G. GABRIEL
BY
ATTORNEYS.

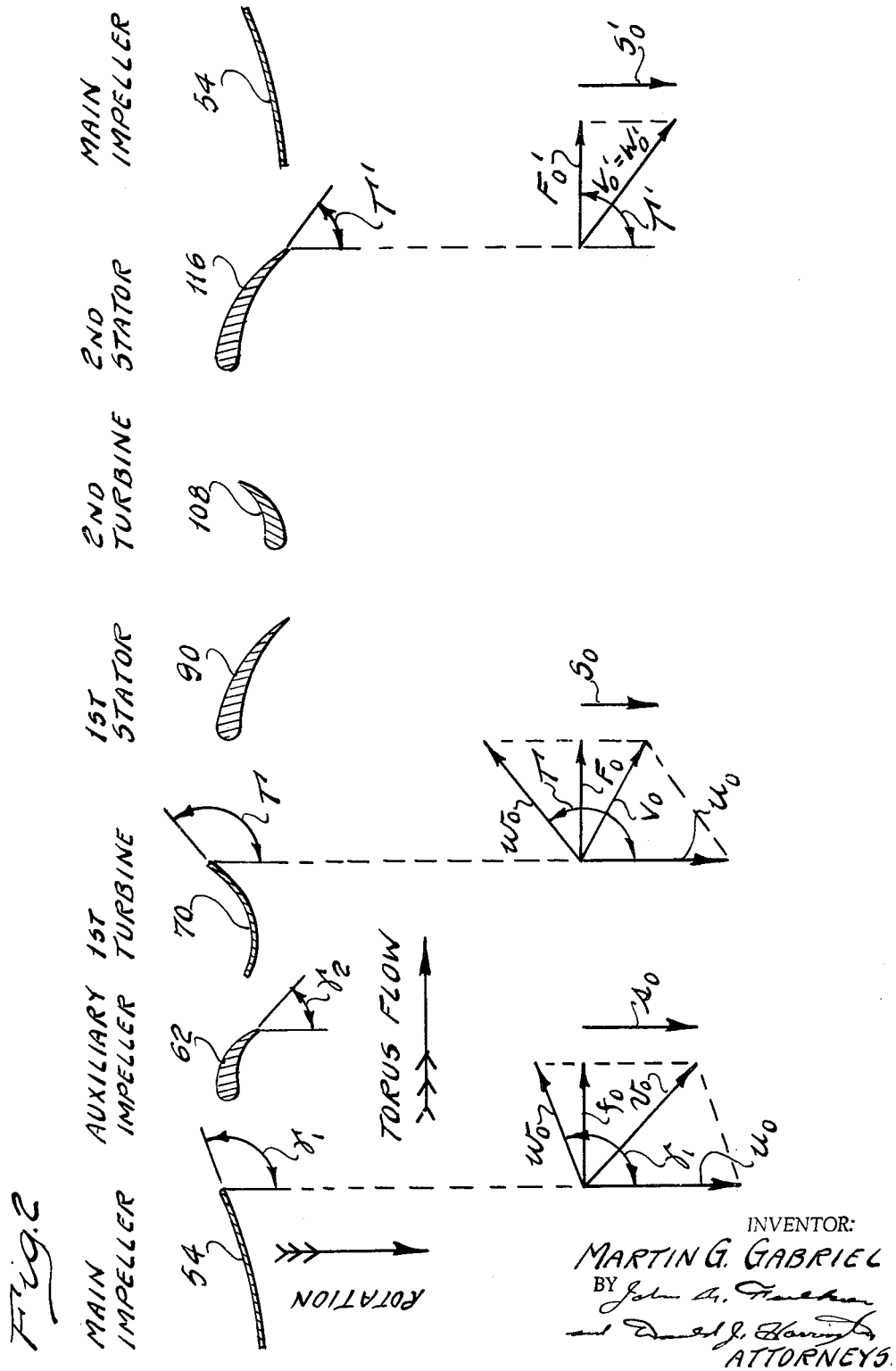

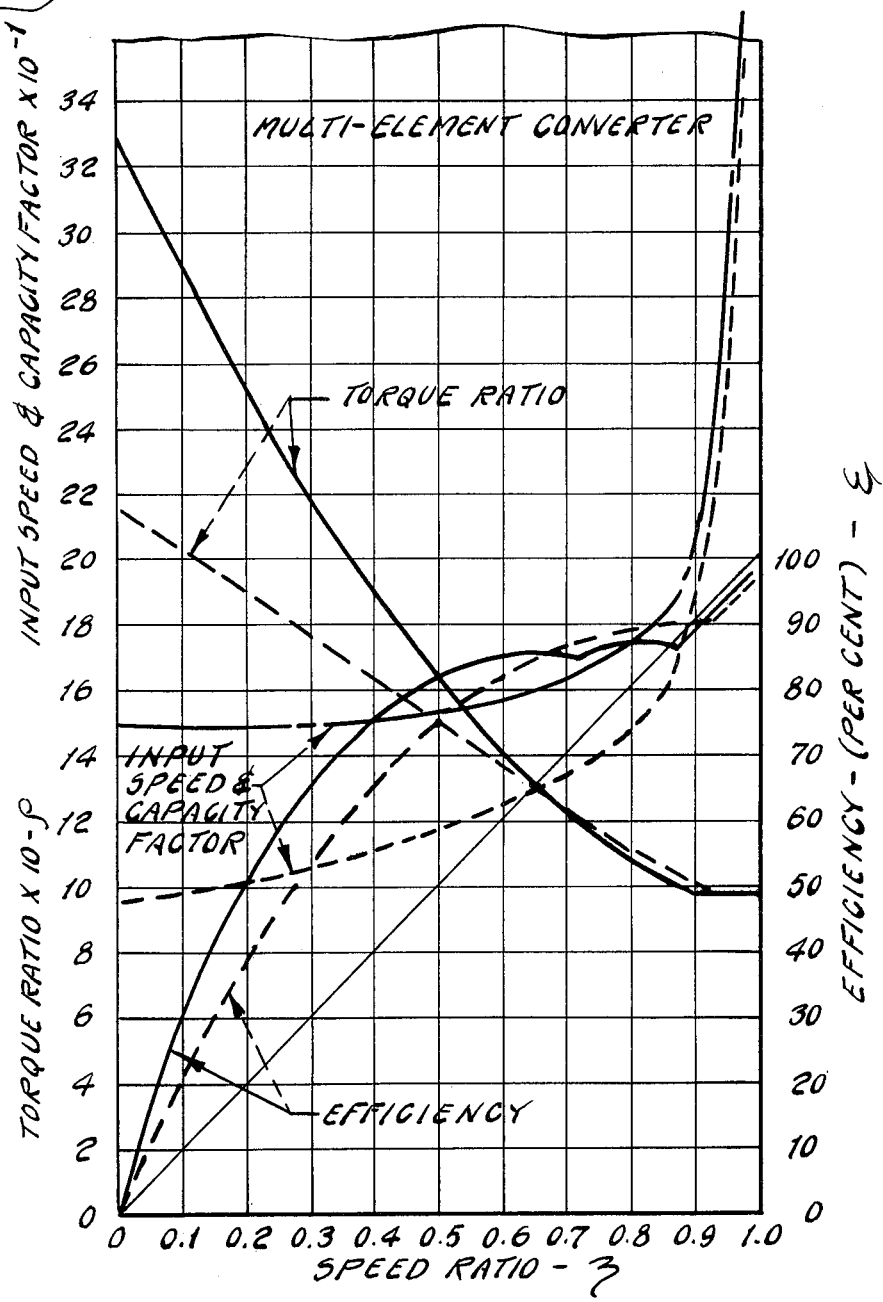

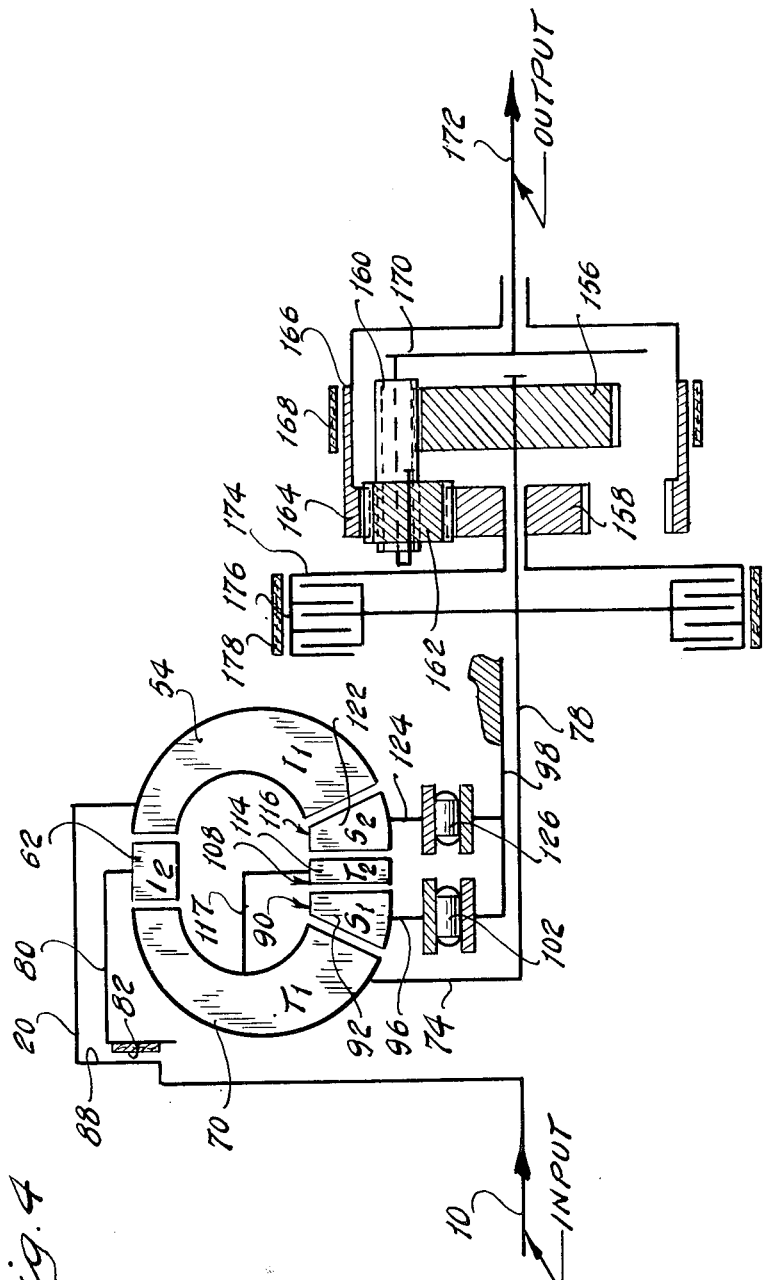

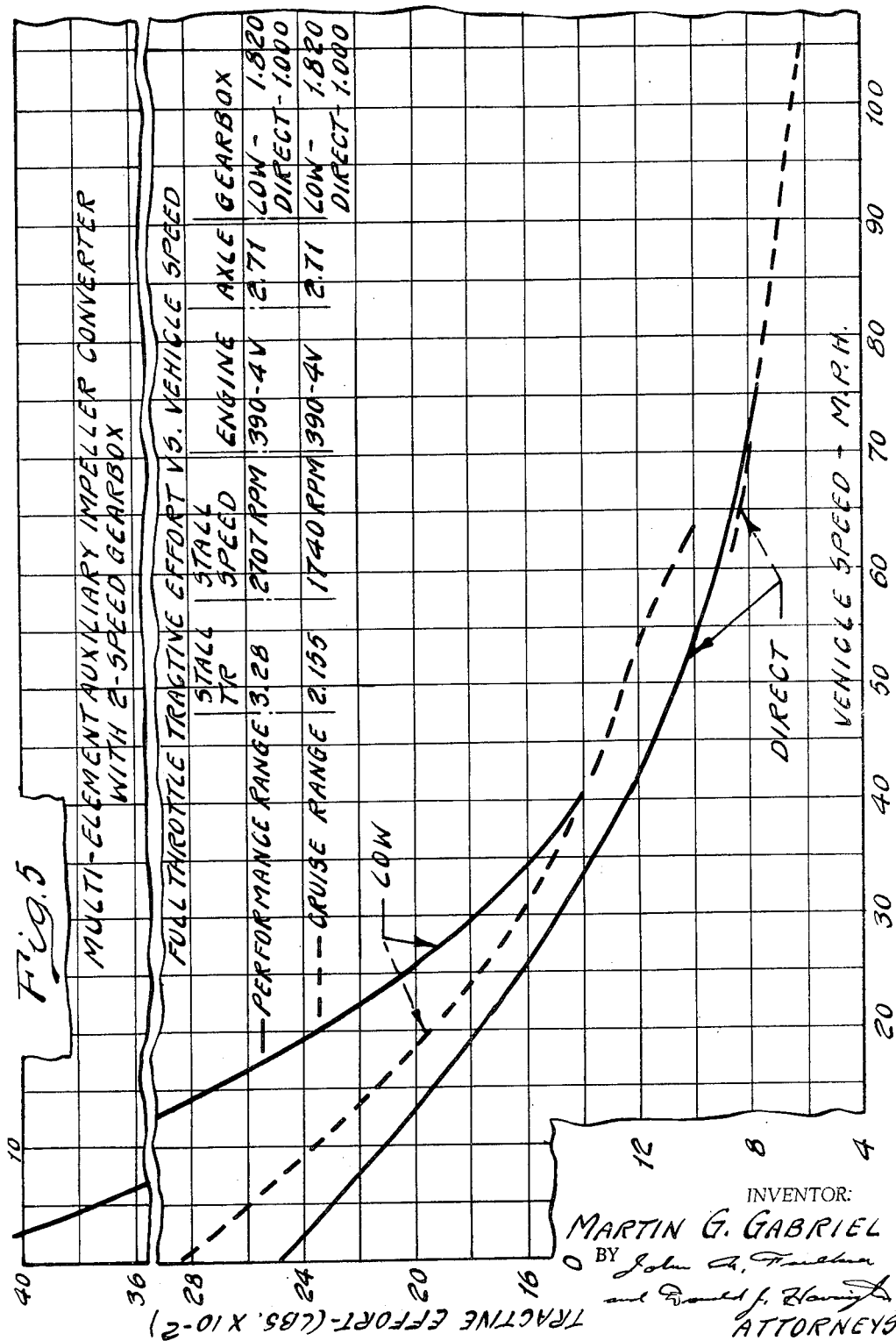

United States Patent Office 3,205,662
Patented Sept. 14, 1965

3,205,662
MULTIPLE ELEMENT HYDROKINETIC TORQUE CONVERTER MECHANISM
Martin G. Gabriel, Dearborn, Mich., assignor to Ford Motor Company, Dearborn, Mich., a corporation of Delaware
Filed Nov. 3, 1964, Ser. No. 408,544
6 Claims. (Cl. 60—54)

My invention relates generally to multiple element hydrokinetic torque converter mechanisms, and more particularly to a hydrokinetic torque converter having a multiple stage turbine assembly and multiple stators situated in a common torus circuit.

According to a principal feature of my invention, I have provided a pair of independently rotatable stators, the motion of each being controlled by separate overrunning couplings. The final stage of the multiple stage turbine assembly is situated between the stators so that each of the respective overrunning couplings will freewheel at a separate speed ratio.

With the final stage for the multiple stage turbine assembly arranged in this fashion, the bladed sections of each stator of the disclosed embodiment of my invention are formed with substantially identical geometries and dimensions. This is in contrast to a conventional multiple stator arrangement wherein the blade geometry of the bladed sections of each stator stage must differ from the corresponding geometry of the bladed sections of the next preceding stage.

The provision of a mechanism of the type above set forth being a principal object of my invention, it is another object of my invention to provide a hydrokinetic torque converter mechanism having multiple turbine stages and multiple stators that are arranged strategically in a torus circuit, and wherein provision is made for forming the bladed sections of the stators with substantially identical geometries and dimensions so that the stator sections can be used interchangeably.

It is a further object of my invention to provide a multiple element hydrokinetic torque converter mechanism wherein provision is made for interchanging two bladed members thereby reducing the manufacturing cost and simplifying the assembly to a degree that has not been possible in multiple element converter mechanisms of known constructions.

It is further object of my invention to provide a hydrokinetic torque converter mechanism of the type set forth in the preceding object wherein provision is made for altering the effective impeller flow exit angle from a value that results in maximum cruising efficiency to a value that corresponds to maxmum torque multiplication. Two performance ranges thus are achieved, one being characterized by a high over-all torque multiplication and the other being characterized by maximum cruising efficiency.

For the purpose of describing my invention more particularly, reference will be made to the accompanying drawings; wherein, FIGURE 1 shows a longitudinal cross-sectional view of a hydrokinetic torque converter embodying the improvements of my invention;

FIGURE 2 shows a blade cascade diagram with the blading of the converter construction of FIGURE 1 in an unwrapped form;

FIGURE 3 is a chart showing the performance characteristics of the mechanism of FIGURE 1;

FIGURE 4 is a schematic diagram showing a transmission system having two geared speed ratio power flow paths and including my improved torque converter mechanism; and FIGURE 5 is a plot showing the vehicle performance characteristics for an automotive vehicle driveline embodying the mechanism illustrated in FIGURE 4.

Figure 1:
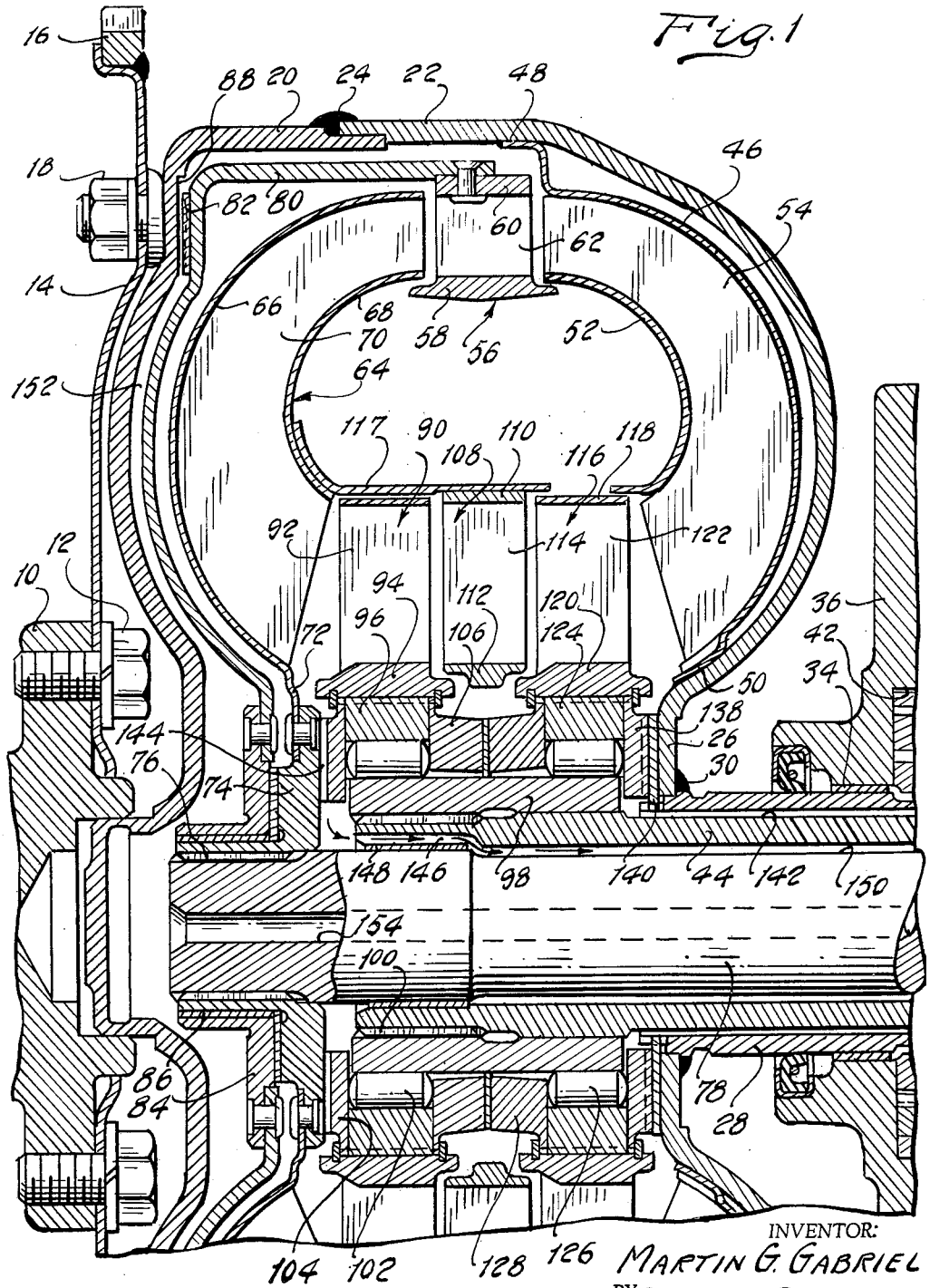

Referring first to FIGURE 1, numeral 10 designates a flanged crankshaft for an internal combustion vehicle engine. It is bolted by means of bolts 12 to a drive plate 14, the periphery of which carries an engine starter motor ring gear 16. The radially outward portion of drive plate 14 is secured by bolts 18 to an impeller shell part 20. A companion impeller shell part 22 is secured at its periphery to the outer periphery of shell part 20 by weld metal, as indicated at 24.

Shell part 22 is generally toroidal in form and its inner hub portion 26 is secured to a supporting sleeve shaft 28. By preference, weld metal 30 is used to form this connection.

Shaft 28 is journaled by means of bushing 34 within an opening formed in the transmission housing bearing support wall 36. The outer periphery of wall 36 is secured by bolts to an internal shoulder 38 formed within the transmission housing itself, the latter being indicated by reference character 40.

Housing 40 encloses the hydrokinetic torque converter mechanism of which shell parts 20 and 22 form a part. The outer periphery of housing 40 may be bolted to the cylinder block of an internal combustion engine in the usual fashion.

Wall 36 is formed with a cavity 42 that receives positive displacement pump elements of an engine driven pump assembly. Driving portions of the pump assembly are drivably keyed or splined to the right hand end of sleeve shaft 28, as indicated in FIGURE 1. This pump assembly may form a fluid pressure source for an automatic control valve system (not shown) for the gearing elements that may be used with the converter of FIGURE 1.

A stationary slator sleeve shaft 44 extends through sleeve shaft 28 and is secured to the wall 36.

The inner surface of the shell part 22 has secured thereto an outer impeller shroud 46. The outer periphery of the shroud 46 is welded or otherwise secured to the outer region of the inner surface of shell part 22, as shown at 48. A corresponding connection at the radially inward region of the shell part 22 is shown at 50. An inner impeller shroud is shown at 52. Disposed between the shrouds 46 and 52 is a series of radial outflow blades 54 which cooperate with the shrouds to define fluid flow passages.

An auxiliary impeller 56 is situated at the flow exit region of the impeller blades 54. It includes an inner shroud 58, an outer shroud 60, and axial flow blades 62. The blades 62 and the shrouds 58 and 60 cooperate to define fluid flow passages that are continuations of the passages of the main impeller blades 54.

The turbine is generally indicated at 64. It includes an outer shroud 66, an inner shroud 68, and radial inflow blades 70. These blades cooperate with shrouds 66 and 68 to define radical inflow passages. The inner hub 72 for the shroud 66 is secured to a hub member 74 that in turn is splined at 76 to a centrally disposed turbine driven shaft 78.

The outer shroud 60 for the auxiliary impeller 56 is connected to a clutch member 80 which has formed on its outer periphery, a friction surface 82. This clutch member extends radially inwardly between the turbine shroud 66 and the adjacent radially inwardly extending portion of the shell part 20. The inner hub of clutch member 80 is secured to a hub member 84 which in turn is journaled by means of bushing 86 upon an axial extension of the hub 74 for the turbine.

Surface 82 is situated directly adjacent an annular surface 88 formed on the interior of the shell part 20. When the surfaces 82 and 88 are frictionally engaged, auxiliary impeller 56 rotates in unison with the main impeller assembly since it then is connected to the shell part 20.

An axially directed clutch engaging force is imparted to the clutch member 80 under the influence of the pressure of the fluid within the torus circuit defined in part by the impeller and turbine.

A first stator member 90 is situated directly adjacent the flow exit region of the turbine blades 70. It includes stator blades 92 that are carried by stator hub 94. This hub in turn is formed within an internally splined opening that receives an outer brake race 96. An inner brake race 98 in the form of a sleeve is splined at 100 to the stator shaft 44. Overrunning brake roller elements 102 are situated between the races 96 and 98. By preference, the outer race 96 can be cammed to permit a camming action with the roller elements 102 thereby providing one-way braking action for the stator 90. Rotation of the stator 90 in a direction opposite to the direction of rotation of the impeller and turbine is inhibited although free running motion in the opposite direction is accommodated. Spacer or thrust elements are situated on either side of the roller elements 102, as shown at 104 and 106. Each of these elements 104 and 106 is received within the internally splined opening in the hub 94. They are held axially fast with respect to the hub 94 by snap rings as indicated.

A secondary turbine element 108 is located on the fluid flow exit side of the stator 90. It includes a first shroud 110 and a second shroud 112. Disposed between the shrouds 110 and 112 is a series of turbine blades 114. The shroud 110 is secured to shroud 68 of the turbine 64 by means of an annular extension 117 carried by the shroud 68.

Disposed between the flow exit side of the blades 114 and the flow exit region of the blades 54 of the impeller is a secondary stator 116. This stator includes a first shroud 118, a hub 120 and stator blades 122. As will be apparent from an inspection of FIGURE 2, the geometry of the blades 122 is the same as the geometry for blades 92.

Hub 120 is formed with an internally splined opening that receives a cooperating externally splined outer brake race 124. Overrunning brake roller elements 126 are received between race 124 and race 98. Race 124 can be cammed to permit one-way camming action with roller elements 126 thus inhibiting rotation of the stator 116 in a direction opposite to the direction of rotation of the turbine and the impeller while accommodating freewheeling motion thereof in the opposite direction. Thrust or spacer elements are situated on the other side of the rollers 126, as indicated at 128 and 130. These elements are externally splined to permit a splined connection with the internally splined opening in the hub 120. They are held axially fast with respect to the hub 120 by snap rings as indicated.

A thrust washer 140 may be situated between the hub portion 26 of the shell part 22 and the element 138.

An annular fluid feed passage 142 is defined by the concentric sleeves 44 and 28. Fluid may be received by this annular passage from a suitable fluid supply passage that in turn receives its fluid from the engine driven pump. The torus circuit thus can be filled with fluid. The flow return path for the fluid is defined in part by radial grooves 144 formed in spacer element 104 and by axial grooves 146 formed in the end of the stationary sleeve shaft 44. Turbine shaft 78 is journaled within the shaft 44 by means of a bushing 148.

The annular space 150 between the shaft 78 and the sleeve 44 completes the flow return passage for the converter fluid. This space may communicate with an exhaust region or with a low pressure lubrication circuit for the transmission mechanism.

The space 152 between clutch member 80 and the shell part 20 communicates with an axially extending passage 154 formed in shaft 78. This passage in turn may communicate with a valve controlled passage that can be connected to the exhaust region or blocked to permit the pressure build-up to occur in the space 152. If a passage 154 is opened to exhaust, a portion of the fluid supplied to annular passage 142 will be distributed through the torus circuit and will pass radially inwardly through the annular space between the surfaces 88 and 82. The spacing of these surfaces is slight, and the radial flow thereacross will produce an orificing action so that the pressure in space 152 will be slightly less than the pressure in the circuit itself. This then will create a pressure unbalance. As soon as the clutch engages under the influence of the pressure unbalance, space 152 assumes the lowest pressure available, which may be atmospheric pressure.

To disengage the friction surfaces 88 and 82, it is merely necessary to pressurize the space 152 by introducing a control pressure into passage 154.

To condition the torque converter mechanism for high performance operation with an augmented torque ratio, the friction surfaces 88 and 82 are disengaged thereby allowing the auxiliary impeller 56 to freewheel in the circuit. It has no influence under these conditions upon the direction of the fluid flow velocity vectors at the exit section of the main impeller blades. On the other hand, the converter can be conditioned for high efficiency cruising performance operation by allowing the friction surfaces 88 and 82 to become engaged so that auxiliary impeller 56 will rotate in unison with the main impeller blades.

Referring to FIGURE 2, I have illustrated a blade cascade diagram and certain fluid flow velocity vectors at critical points in the torus circuit. The symbol $w_0$ designates the flow velocity vector along the main impeller blades and the symbol $u_0$ represents the velocity vector due to the rotation of the impeller. The symbol $f_0$ represents the torus flow velocity vector. The vector sum, which may be referred to as the absolute fluid flow velocity vector, is indicated at $v_0$. The impeller blade flow exit angle for the blades 54 is designated by the symbol $\gamma_1$.

A similar nomenclature has been used to designate the flow velocity vectors for a particle fluid at the flow exit section of the first turbine although capital notations have been employed to differentiate from the corresponding vector rotations for a particle fluid at the flow exit section of the impeller. The corresponding vectors for a particle of fluid at the exit section of the second stator 116 also are designated in FIGURE 2, although primed capital notations have been employed.

In FIGURE 2, it is seen that if the auxiliary impeller clutch structure is engaged, the effective blade exit angle will change from a value of $\gamma_1$ to a value of $\gamma_2$, the latter being substantially less than the former. Under these conditions, the size factor for the converter will be reduced substantially, and the torque ratio at low speed ratios will be reduced. On the other hand at high speed ratios, the efficiency is improved substantially, and the coupling efficiency at speed ratios greater than the so-called clutch point also is improved.

The direction of the absolute fluid flow velocity vector obviously will change substantially if the effective impeller blade exit angle itself changes since it is dependent upon the flow vector along the blade and the rotational vector. The changed direction of the absolute fluid flow velocity vector that is occasioned by the auxiliary impeller clutch is such that the performance characteristics of the unit itself are changed.

The torque exerted upon the turbine is equal to the moment of momentum of the fluid that leaves the impeller assembly less the moment of momentum of the fluid that leaves the turbine blades. The moment of momentum for a particle fluid at any point in the circuit is equal to the mass of that particle times its operating radius times the tangential component of the fluid flow velocity vector. In FIGURE 2, this vector is represented by the symbol $s_0$ for a fluid particle at the flow exit section of the main impeller blades and by the symbol $S_0$ for a particle fluid at the flow exit section of the turbine blades. Thus the turbine torque that is developed for any given impeller torque can be influenced by clutching or disengaging the auxiliary impeller.

In FIGURE 3, I have illustrated the performance characteristics of the converter of FIGURE 1 for each of the performance ranges. I have shown in FIGURE 3 a plot of the size factor, the torque ratio and the efficiency. The size factor, as indicated previously, is measured by the impeller speed divided by the square root of the impeller torque. It will be observed that two clutch points are achieved. The first clutch point is about .72 speed ratio during operation in the high performance range and the second clutch point occurs at a speed ratio of about .86. The first clutch point is achieved as the first stator 90 begins to freewheel, and the second clutch point is achieved as the stator 116 freewheels. The first stator 90 directs the fluid flow that leaves the bladed sections of the first turbine so that the entrance angle will be favorable for the second turbine stage thereby permitting the fluid to undergo a change in the magnitude of the tangential fluid flow velocity vector. The fluid that flows through the blading for the second turbine stage 108 is redirected again by the second stator 116 so that the entrance angle for the impeller blades 54 will be favorable for torque multiplication.

As best seen in FIGURE 2, the geometries for the blades of the first and second stators can be identical. Therefore, it is possible to form the stator blades and their associated hubs so that they can be interchanged. This greatly reduces the manufacturing costs and assembly time. It eliminates also tooling and manufacturing operations since the same tooling and assembly techniques can be used for making both stators.

Referring next to FIGURE 4, I have illustrated in schematic form a two-speed gearing arrangement that may be used with the converter construction of FIGURE 1. It includes a first large sun gear 156, a second smaller sun gear 158, a set of long planet pinions 160 and a set of short planet pinions 162. Pinions 162 engage drivably a ring gear 164 which has formed thereon a brake drum 166. A reverse brake band 168, which surrounds drum 166, may be applied and released selectively by means of a valve controlled fluid pressure operated servo.

The sets of pinions 160 and 162 are carried by a common carrier 170, which in turn is connected to a driven member 172. This member in turn can be connected through a suitable driveline and differential gear mechanism to the vehicle traction wheels. Sun gear 156 is connected directly to turbine driven shaft 78.

Sun gear 158 can be clutched to shaft 78 by means of a selectively engageable clutch assembly 174. The assembly 174 includes a brake drum 176 that is connected directly to the sun gear 158. A low speed brake band 178 surrounds drum 176 and can be applied to condition the gearing arrangement for low speed ratio operation.

During high speed ratio operation, the brakes are disengaged and the clutch 174 applied thereby locking together the sun gears. This causes the planetary gear elements to rotate in unison with a 1:1 speed ratio. Reverse drive is accomplished by engaging brake band 168 while brake band 178 is released and by releasing the clutch assembly.

In FIGURE 5, I have illustrated the performance characteristics for a vehicle having a transmission system of the type illustrated schematically in FIGURE 4. For purposes of illustration, the vehicle driveline having the performance indicated in FIGURE 5 is assumed to include a 390 cubic inch displacement, commercial, internal combustion engine. It includes also an axle and differential having a speed ratio of 2.71. It is assumed also that the low speed ratio for the gearing arrangement is 1.82. The hydrokinetic torque ratio that may be obtained by the mechanism of FIGURE 1, when it is conditioned for high performance operation, is equal to 3.28 at stall. The corresponding speed ratio for the cruising range is 2.155. The stall speeds for each of these ranges are 2707 r.p.m. and 1740 r.p.m. respectively.

Having thus described a preferred embodiment of my invention, what I claim and desire to secure by U.S. Letters Patent is:

1. A hydrokinetic torque converter mechanism comprising a bladed impeller assembly, a bladed turbine assembly and compound stators situated in a toroidal fluid flow circuit, said impeller assembly comprising radial outflow bladed passages, said turbine assembly comprising a first and second stage, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate, juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency cruising performance.

2. A hydrokinetic torque converter mechanism comprising a bladed impeller assembly, a bladed turbine assembly and compound stators situated in a toroidal fluid flow circuit, said impeller assembly comprising radial outflow bladed passages, said turbine assembly comprising first and second stages, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate, juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency cruising performance, and a control pressure passage in fluid communication with a space between said shell and said clutch element whereby said space can be pressurized and exhausted selectively to effect engagement and release of said clutch element.

3. A hydrokinetic torque converter mechanism comprising a bladed impeller assembly, a bladed turbine assembly and compound stators situated in a toroidal fluid flow circuit, said impeller assembly comprising radial outflow bladed passages, said turbine assembly comprising a first and second stage, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate, juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency cruising performance, the geometry of the blades of said first stator being substantially identical to the geometry of the blades of said second stator, each stator being formed with substantially identical dimensions.

4. A hydrokinetic torque converter mechanism comprising a bladed impeller assembly, a bladed turbine assembly and compound stators situated in a toroidal fluid flow circuit, said impeller assembly comprising radial outflow bladed passages, said turbine assembly comprising a first and second stage, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate, juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency crusing performance, and a control pressure passage in fluid communication with a space between said shell and said clutch element whereby said space can be pressurized and exhausted selectively to effect engagement and release of said clutch element, the geometry of the blades of said first stator being substantially identical to the geometry of the blades of said second stator, each stator being formed with substantially identical dimensions.

5. A hydrokinetic torque converter mechanism comprising a bladed impeller assembly, a bladed turbine assembly and compound stators situated in a toroidal fluid flow circuit, said impeller assembly comprising radial outflow bladed passages, said turbine assembly comprising a first and second stage, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate, juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency cruising performance, the geometry of the blades of said first stator being substantially identical to the geometry of the blades of said second stator, each stator being formed with substantially identical dimensions, the leading and trailing edges for the blades of each stator section being situated in a plane that is substantially perpendicular to the axis of said converter mechanism.

6. A hydrokinetic torque converter mechanism comprising a bladed impeller assembly, a bladed turbine assembly and compound stators situated in a torodial fluid flow circuit, said impeller assembly comprising radial outflow bladed passages, said turbine assembly comprising a first and second stage, the first turbine stage defining radial inflow bladed passages and the second turbine stage being situated in an axial flow, radially inward region of said circuit, said turbine stages being connected together, said compound stator assembly comprising a first stator stage having flow directing blades situated between the turbine stages, a second stator stage comprising stator blades situated between the flow exit region of the second turbine stage and the flow entrance region of the impeller assembly, each stator stage being rotatably mounted upon a common stator shaft, a separate overrunning brake means for anchoring each stator stage against said stator shaft to inhibit rotation thereof in a direction opposite to the direction of rotation of said driven assembly while accommodating freewheeling motion thereof in the opposite direction, said impeller assembly including a bladed auxiliary impeller having flow directing blades situated in an axial flow, radially outward region of said circuit, a clutch element connected to the blades of said auxiliary impeller, an annular friction surface formed on said clutch element, an impeller shell connected to said impeller assembly and enclosing said turbine assembly, and a second annular friction surface carried by said impeller shell, said friction surfaces being situated in proximate juxtaposed relationship at a radially outward location, said clutch element being subjected to the pressure of the fluid in said torus circuit and responsive thereto to urge said friction surfaces into clutching engagement thereby causing said auxiliary impeller to rotate with said impeller shell to provide an effective flow exit geometry for said impeller assembly that is favorable for high efficiency cruising performance, a control pressure passage in fluid communication with a space between said shell and said clutch element whereby said space can be pressurized and exhausted selectively to effect engagement and release of said clutch element, the geometry of the blades of said first stator being substantially identical to the geometry of the blades of said second stator, each stator being formed with substantially identical dimensions, the leading and trailing edges for the blades of each stator section being situated on a plane that is substantially perpendicular to the axis of said converter mechanism.

References Cited by the Examiner

UNITED STATES PATENTS

| | | | |
|---|---|---|---|
| 2,170,649 | 8/39 | Banker | 60—54 X |
| 2,762,196 | 9/56 | Ullery | 60—54 |
| 2,762,197 | 9/56 | Ullery | 60—54 |
| 2,762,198 | 9/56 | Ullery | 60—54 |
| 2,911,852 | 10/59 | Russell | 60—54 X |
| 3,079,756 | 3/63 | Farrell | 60—54 |

JULIUS E. WEST, *Primary Examiner.*